(12) United States Patent
Morris et al.

(10) Patent No.: US 6,934,460 B2
(45) Date of Patent: Aug. 23, 2005

(54) COMPENSATION AND/OR VARIATION OF WAFER LEVEL PRODUCED LENSES AND RESULTANT STRUCTURES

(75) Inventors: James Morris, Charlotte, NC (US); Michael R Feldman, Huntersville, NC (US)

(73) Assignee: Digital Optics Corp, Charlotte, NC (US)

( * ) Notice: Subject to any disclaimer, the term of this patent is extended or adjusted under 35 U.S.C. 154(b) by 0 days.

(21) Appl. No.: 10/956,080

(22) Filed: Oct. 4, 2004

(65) Prior Publication Data

US 2005/0047748 A1 Mar. 3, 2005

Related U.S. Application Data

(62) Division of application No. 10/698,632, filed as application No. PCT/US01/20033 on Jun. 22, 2001, now Pat. No. 6,836,612.
(60) Provisional application No. 60/267,432, filed on Feb. 9, 2001.

(51) Int. Cl.$^7$ ................................................. G02B 6/00
(52) U.S. Cl. ...................................... 385/147; 359/619
(58) Field of Search ................................ 385/140–147, 385/4, 14, 15, 31, 39; 359/619, 566; 501/56; 430/5

(56) References Cited

U.S. PATENT DOCUMENTS

| | | | | |
|---|---|---|---|---|
| 5,444,572 A | * | 8/1995 | Gal et al. .................. | 359/619 |
| 6,524,756 B1 | * | 2/2003 | Wu ............................... | 430/5 |
| 6,562,523 B1 | * | 5/2003 | Wu et al. ..................... | 430/5 |
| 2002/0019305 A1 | * | 2/2002 | Wu ............................. | 501/56 |
| 2003/0207747 A1 | * | 11/2003 | Wu et al. .................... | 501/56 |
| 2003/0227684 A1 | * | 12/2003 | Goto .......................... | 359/566 |

FOREIGN PATENT DOCUMENTS

JP         5-8441        1/1993

* cited by examiner

*Primary Examiner*—Akm Enayet Ullah
(74) *Attorney, Agent, or Firm*—Susan S Morse

(57) ABSTRACT

An array of micro-optical components includes at least two micro-optical components. Each micro-optical component includes a refractive surface and a corresponding compensation surface for the refractive surface. The corresponding compensation surface includes a corresponding compensation feature when the refractive surface deviates from a desired optical performance. The micro-optical component provides the desired optical performance. At least two refractive surfaces of the array of micro-optical components are formed to have substantially a same desired optical performance. The array of micro-optical components includes at least one corresponding compensation feature, at least two compensation surfaces of the array of micro-optical components being different from one another. The compensation surface may be created after measuring the refractive surface.

16 Claims, 4 Drawing Sheets

US 6,934,460 B2

COMPENSATION AND/OR VARIATION OF WAFER LEVEL PRODUCED LENSES AND RESULTANT STRUCTURES

The present application claims priority under 35 U.S.C. §119 and/or §120 to allowed U.S. application is a divison of Ser. No. 10/698,632, filed Nov. 3, 2003 now U.S. Pat. No. 6,836,612, which in turn claims priority of PCT/US01/20033, filed Jun. 22, 2001, which in turn claims priority of U.S. provisional application Ser. No. 60/267,432, filed Feb. 9, 2001, the entire contents of all of which are hereby incorporated by reference in their entirety for all purposes.

BACKGROUND OF THE INVENTION

1. Field of the Invention

The present invention is directed to making lenses on a wafer level, in particular to using wafer processing techniques to create a desired lens functioning, illustratively starting with substantially identical base lenses formed on a wafer level, and structures formed thereby.

2. Description of Related Art

Previous wafer level manufacturing techniques have assumed that the lenses made on the wafer level were identical within required parameters for their end use. As tighter tolerances are required, this assumption may no longer be realistic. As the use of arrays of micro-optical lenses becomes more prevalent, differences between lenses therein may result in erroneous functioning. Further, many applications are now requiring the use of microlens arrays in which the microlenses therein have different properties, e.g., different focal lengths. Typically, such different arrays were created using different parameters for the underlying lenses themselves. However, it is easier to create a wafer of substantially identical microlenses than to try to adjust the parameters for individual microlenses thereon.

This creation of an array of different lenses is particularly difficult when the microlenses are to be refractive lenses created using reflow techniques. When etching reflowed lenses into a substrate, lenses having different radii of curvature require the chemistry used during etching to be altered at different points. Thus, the creation of an array of different reflowed refractive lenses on a wafer level becomes impractical.

SUMMARY OF THE INVENTION

The present invention is therefore directed to methods and structures which overcome at least one of the above disadvantages.

It is an object of the present invention to compensate and/or vary optical characteristics of an optical lens structure based on a substantially identical refractive surfaces created on the wafer level.

It is another object of the present invention to correct for variations in a refractive surfaces created on a wafer level from a desired functioning.

It is another object of the present invention to create an array of microlens structures having different optical characteristics based on an array of substantially identical refractive surfaces created on the wafer level.

At least one of the above and other objects may be realized by providing an array of micro-optical components includes at least two micro-optical components. Each micro-optical component includes a refractive surface and a corresponding compensation surface for the refractive surface. The corresponding compensation surface includes a corresponding compensation feature when the refractive surface deviates from a desired optical performance. The micro-optical component provides the desired optical performance. At least two refractive surfaces of the array of micro-optical components are formed to have substantially a same desired optical performance. The array of micro-optical components includes at least one corresponding compensation feature, at least two compensation surfaces of the array of micro-optical components being different from one another.

All combinations of refractive surfaces and corresponding compensation surface may operate at a same focal length or different combinations may operate at different focal lengths. The refractive surfaces and the corresponding compensation surfaces may be formed on a same substrate or on different substrates of at least two substrates bonded together. The corresponding compensation features may correct for aberrations in a corresponding refractive surface.

The corresponding compensation features may include a corresponding separation of the corresponding compensation surface from the refractive surface in accordance with a desired focal length of the combination of the refractive surface and the corresponding compensation surface. The corresponding separations may be formed in accordance with a measured focal length of a corresponding refractive surface.

The desired focal point of the micro-optical component may be on a back surface of a substrate on which the micro-optical components are formed or on a substrate bonded thereto.

The corresponding compensation features may include a diffractive element, which may correct for aberrations in a corresponding refractive surface.

At least one of the above and other objects may be realized by providing a method of forming micro-optical components having a desired optical performance. This includes creating a plurality of refractive surfaces on a substrate, providing a corresponding plurality of compensation surfaces, one for each refractive surface, measuring an optical performance of at least one refractive surface of the refractive surfaces, comparing measured optical performance with a desired optical performance, forming a compensation profile on a compensation surface when a corresponding refractive surface deviates from its desired optical performance, creating refractive surface-compensation surface pairs, each pair having its desired optical functioning; and separating the plurality of pairs into a desired number of micro-optical components.

The separating may create a plurality of pairs or may create at least one array of pairs.

The forming of compensation features may include forming compensation features on the substrate on which the plurality of refractive surfaces have been formed. The forming of compensation features may include forming the compensation features on a different substrate than the substrate on which the plurality of refractive surfaces have been formed, and bonding the substrate having the compensation features and the substrate having the plurality of refractive surfaces. The forming of compensation features may include etching the substrate in accordance with a desired focal length of the micro-optical component. The etching may result in different focal lengths for at least two of the micro-optical components. The forming of compensation features includes etching the substrate in accordance with a measured focal length of the corresponding refractive surface. The forming of compensation features may include etching using a single mask to simultaneous create a pattern for all of the compensation features. The forming of compensation features may include etching using a single mask to create a pattern for the compensation features, the single mask being moved to create the pattern for the compensation features. The forming of compensation features may include forming a diffractive element. The forming of compensation features may include creating at least two corresponding compensation features for different compensation surfaces that are different from one another.

A desired focal point of the micro-optical components may be on a back surface of a substrate on which said at least two refractive surfaces are formed or on a substrate bonded thereto.

The creating of the plurality of refractive surfaces may include using the same process for all of the refractive surfaces.

The measuring of optical performance may include measuring optical performance for each refractive. The measuring of optical performance may include measuring optical performance for a subset of the plurality of refractive surfaces.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF THE EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known devices and methods are omitted so as not to obscure the description of the present invention with unnecessary details.

Figure 1:
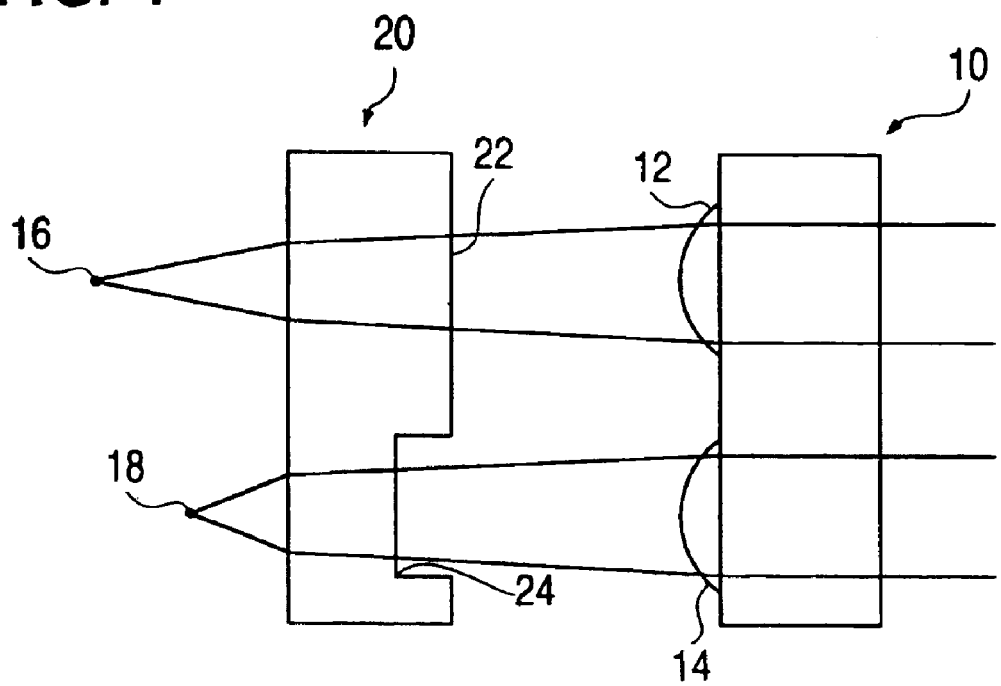
FIG. 1 is a schematic side view of a microlens system in accordance with an embodiment of the present invention.

FIG. 1 illustrates a lens array 10, here shown with two lenses 12, 14, which are substantially identical to one another. In a desired application, these two lenses 12, 14 are to have different focal lengths. Such applications may include using the lens array 10 to collimate or focus two or more sources 16, 18 provided at different distances from the lens array. By providing a thickness compensator 20, here shown as an etched spacer wafer presenting a first thickness 22 and a second thickness 24, the resulting optical path length is the same for both lenses. Thus, while the lenses 12, 14 are the same and the sources 16, 18 corresponding thereto are at different positions, the output of the resultant lens structure of the lenses 12, 14 and corresponding thicknesses 22, 24 is the same.

When it is assumed that the substantially similar lenses 12, 14 are within the required tolerances for the desired application, the thickness compensator 20 may be a spacer wafer having various etch depths 22, 24 therein, which may be formed using a mask. Not every refractive surface may require the thickness compensator 20 to be etched, e.g., when the thickness provided by the compensator 20 alone is appropriate. Since the desired focal lengths are known, the pattern for the different etch depths may be provided on a mask which is then transferred to a substrate, bonded to the wafer of micro-optics, with the resultant structure providing the desired focal length to the corresponding sources. While the configuration shown in FIG. 1 is especially advantageous when the microlens system is to replace a graded index (GRIN) lens, since a flat surface at the interface will be provided, the thickness compensator may to also be etched on an opposite face of the refractive lenses, with the orientation of the resultant structure depending upon the end use.

Figure 2:
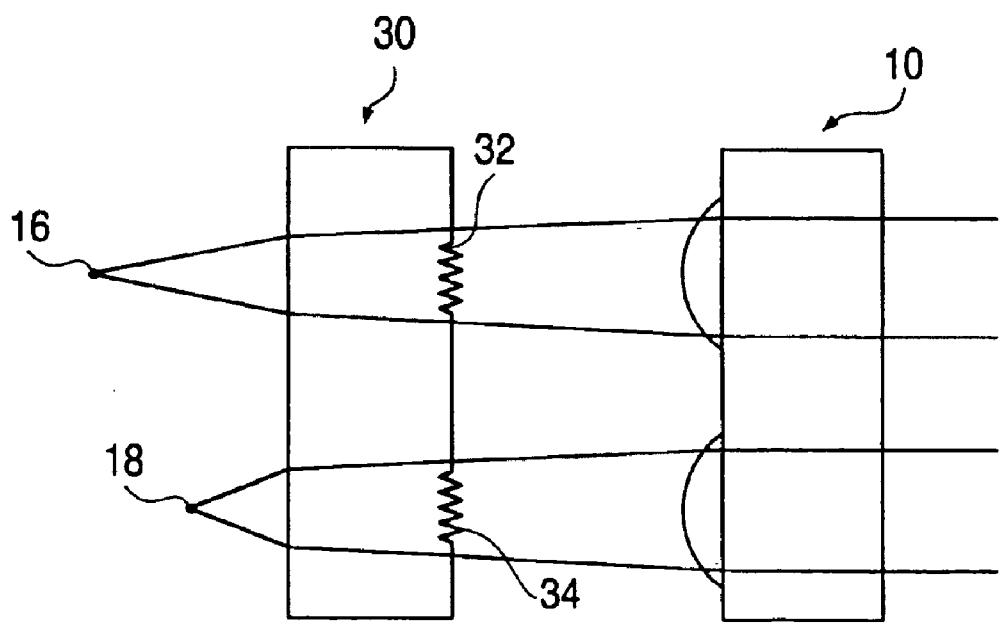
FIG. 2 is a schematic side view of a microlens system on a substrate in accordance with an embodiment of the present invention.

If parameters in addition to or other than focal length are to be altered, other optical elements may be provided in the system rather than or along with the spacer elements 22, 24. Rather than a thickness compensator 20, a profile compensator 30 is provided, as shown in FIG. 2. For example, diffractive elements 32, 34 may vary the focal lengths, other parameters, and/or correct for aberrations, e.g., variations in the conic constant, in the array. These diffractive elements 32, 34 may be different from one another. Further, not all refractive surfaces in the array 10 may required any compensation features. The corresponding compensation surface of the compensator 30 for these refractive surfaces would then be left blank.

Figure 3:
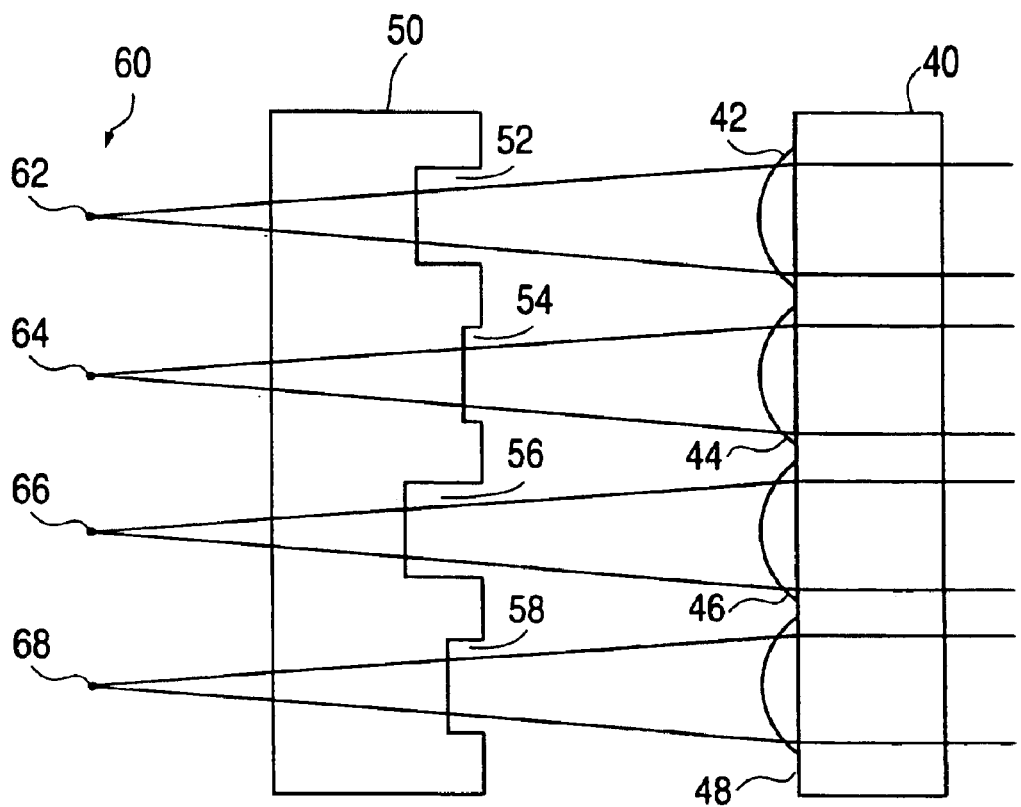
FIG. 3 is a schematic side view of a microlens system on a substrate in accordance with an embodiment of the present invention.

When the-parameters of the lens system itself are not to be varied, but are rather to be maintained within a certain tolerance level for a desired application, deviations from the desired output may be compensated for in a similar fashion. In other words, the above compsenators may be used to correct for variations in the fabrication process. For example, as shown in FIG. 3, if variations in the fabrication process result in microlenses 42–48 on a wafer 42 deviating from a desired focal length outside the tolerances for the end use, a thickness compensator 50 with various etch depths 52–58 can be used to compensate for the variations in the focal lengths for the corresponding microlenses to within the desired tolerances. As can be seen in FIG. 3, the microlens components (42, 52), (44, 54), (46, 56), (48, 58) focus/collimate to/from detectors/sources 62–68 from the same input plane to the same output plane. While the microlenses 42–48 are shown in FIG. 3 functioning as an array, once bonded with the wafer 50 containing the varying etch depths, this resultant structure may also be diced to form any desired array of microlens components or individual microlens components.

Figure 4:
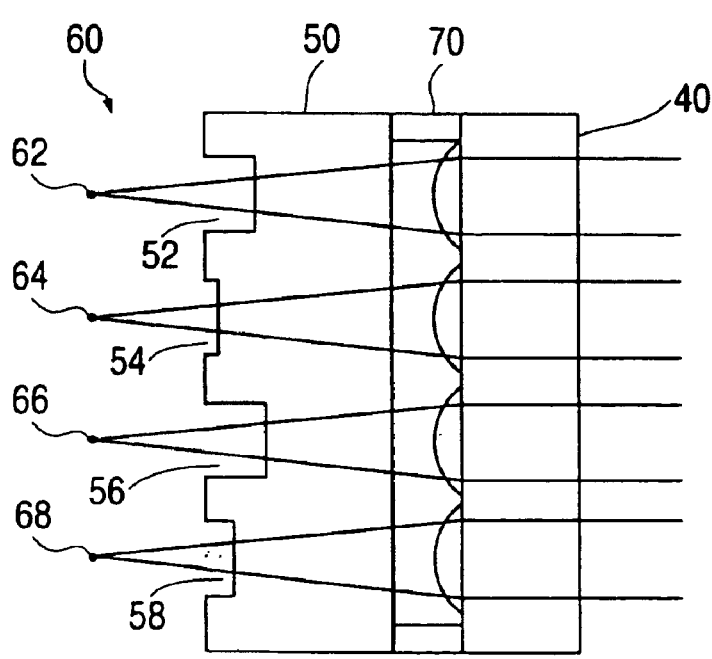
FIG. 4 is a schematic side view of a microlens system on a substrate in accordance with an embodiment of the present invention.
Figure 5:
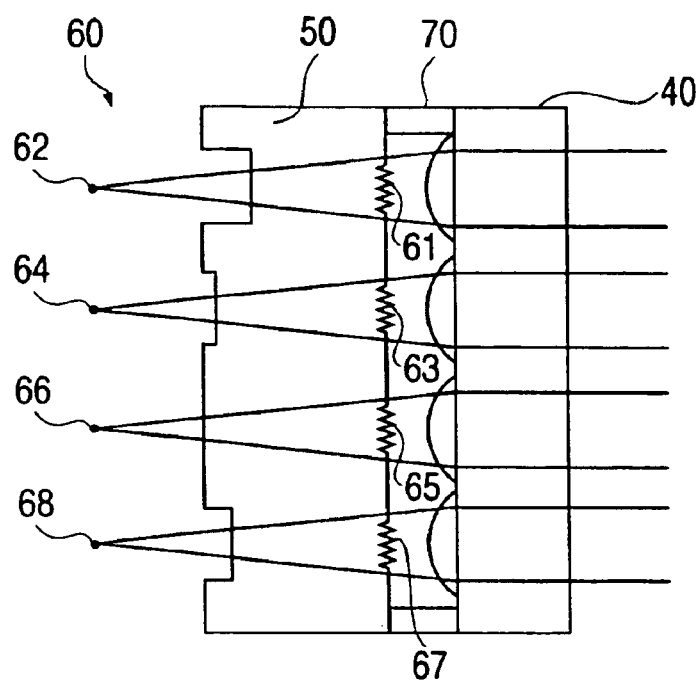
FIG. 5 is a schematic side view of a microlens system on a substrate in accordance with an embodiment of the present invention.
Figure 6:
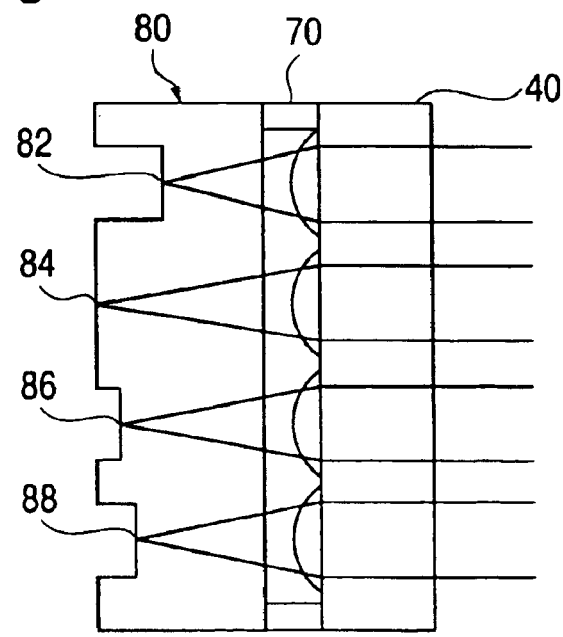
FIG. 6 is a schematic side view of a microlens system on a substrate in accordance with an embodiment of the present invention.
Figure 7:
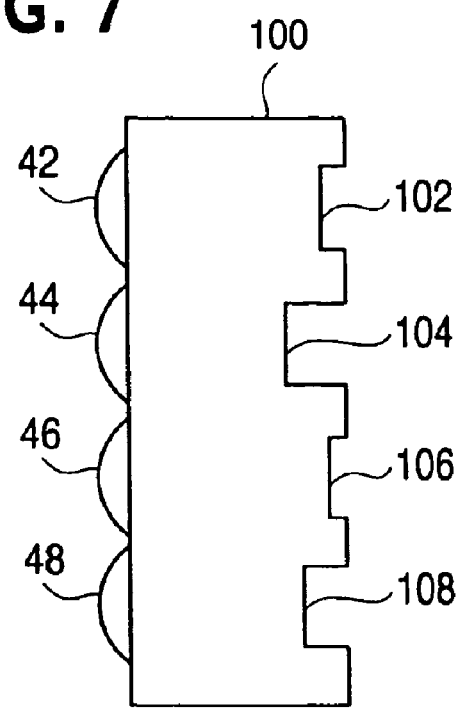
FIG. 7 is a schematic side view of a microlens system on a substrate in accordance with an embodiment of the present invention.
Figure 8:
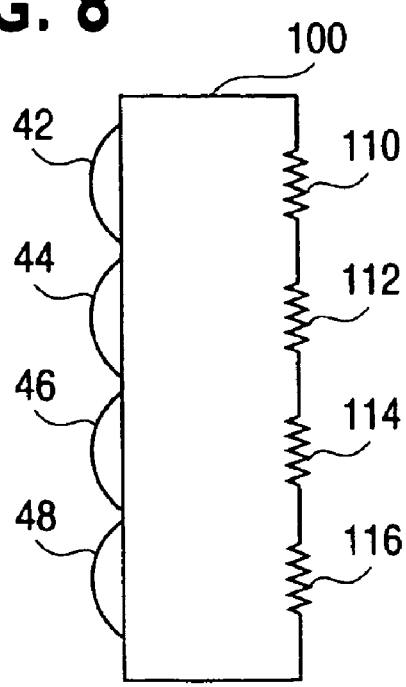
FIG. 8 is a schematic side view of a microlens system on a substrate in accordance with an embodiment of the present invention.

When the end structure is to be an array of microlens components and a flat surface for coupling is not needed, the etch depths may be provide on an opposite surface of the substrate, as shown, for example in FIGS. 4–8. This configuration is particularly useful when all of the sources or devices to be coupled to 62–68 are set to a fixed distance. In FIGS. 4–6, the two substrates 50, 40 are shown bonded together by bonding material 70. FIGS. 7 and 8 illustrate a single substrate configuration.

In addition to or instead of correcting for focal lengths, additional optical elements, shown in FIG. 5 as diffractive elements, may be incorporated to correct for focal lengths or other errors in the refractive surfaces.

When the wafer 40 is to be diced to form individual microlens components, the individual etch depths may be created to provide the focus at the surface of the substrate. The configuration is useful when no air gaps should be introduced into a system, e.g., when coupling to or from a fiber. Rather than adjusting the apparent focal lengths of the microlens components, the substrate is etched so that the focus of the corresponding refractive surface is incident thereon. In contrast to the previous embodiments, the focal lengths of the refractive surfaces are not corrected to be a desired focal length, but rather the corresponding thickness of the substrate 80 is set to the actual focal length of the refractive surfaces, as shown in FIG. 6.

While the above embodiments have employed two substrates, one substrate with the microlenses thereon and the other substrate having compensators thereon, if a single surface is sufficient to provide the desired result, then the structure may be formed on a single substrate 100, as shown in FIGS. 7 and 8, with the refractive surfaces 42–48 on one side, and the compensation features 102–108 or 110–116 on the other. Having a single substrate reduces positioning errors.

When the refractive surfaces are to be corrected, a variety of manufacturing techniques may be employed. When the refractive surfaces have sufficiently similar deviations from a desired parameter, the same structure may be provided for all refractive surfaces. If the refractive surfaces are predictably off each time they are generated in accordance with their respective position on the substrate, a mask may be created to form the compensator. If adjacent refractive surfaces suffer from similar errors, one refractive surface may be measured and the same compensator may be provided for appropriate refractive surfaces. For situations where there are a fixed number of variations across the array, e.g., five, one of these different patterns may be provided where appropriate. In the most comprehensive compensation, the parameters of interest for each refractive surfaces are measured, with a compensator being created for each refractive surfaces on the measurement.

When compensating for measured refractive surface variations from a desired focal length, instead of creating a mask for each wafer, a stepper can be used to create the desired etch depths. For example, the refractive surfaces may be created on the first side of a substrate in a conventional manner, e.g., using reflow or gray scale lithography. The focal length of each refractive surface is then measured. On the other side of the substrate opposite the refractive surface, the substrate may be etched to provide an appropriate thickness such that the combination of the refractive surfaces and its corresponding substrate thickness provide a desired focal length. Rather than creating a mask for the etching, the stepper of the lithographic equipment and a mask with a single rectangular or square opening can be used. For example, if the lens diameter, or useful area, is 300 microns, a 300 microns by 300 micron square opening can be used for the mask. This opening is stepped across the wafer one lens at a time, only certain portions corresponding to certain refractive surfaces are exposed in accordance with the measured focal lengths. After exposure, the second side of the substrate is selectively etched. This process may be repeated N times to achieve up to $2^N$ different levels of etch depth. Such etching is set forth, for example, in U.S. Pat. Re 36352 to Swanson et al. Alternatively, the mask may be stepped and exposed with different exposure energies to get an essentially arbitrary number of distinct levels. After such varying exposure energies, the entire wafer could be etched one time to achieve the different etch depths corresponding to the exposure energy. Any other transfer process, e.g., laser direct write, which varies etch depth with exposure, may be used.

Of course, the use of the compensator to both adjust the focal lengths across the array to be different from one another and to improve any errors arising from the processing may both be incorporated in determining the required compensation. Further, the material in which the etch depths are formed may be of a higher refractive index than the refractive microlenses, so that variations in thickness will have a more significant impact on the focal length of the combination. This material may be a different substrate material or may be a layer of material provided on a substrate in which the varying etch depths are formed. Alternatively, rather than etching, selective deposition of material may be sued to form the compensation features.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. A method of forming micro-optical components having a desired optical performance comprising:
   creating a plurality of refractive surfaces on a substrate;
   providing a corresponding plurality of compensation surfaces, one for each refractive surface;
   measuring an optical performance of at least one refractive surface of said refractive surfaces;
   comparing measured optical performance with a desired optical performance;
   forming a compensation profile on a compensation surface when a corresponding refractive surface deviates from its desired optical performance;
   creating refractive surface-compensation surface pairs, each pair having its desired optical functioning; and
   separating the plurality of pairs into a desired number of micro-optical components.

2. The method of claim 1, wherein said separating creates a plurality of pairs.

3. The method of claim 1, wherein said separating creates at least one array of pairs.

4. The method of claim 1, wherein said forming of compensation features includes forming compensation features on the substrate on which the plurality of refractive surfaces have been formed.

5. The method of claim 1, wherein said forming of compensation features includes forming the compensation features on a different substrate than the substrate on which the plurality of refractive surfaces have been formed, the method further comprising bonding the substrate having the compensation features and the substrate having the plurality of refractive surfaces.

6. The method of claim 1, wherein said forming of compensation features includes etching the substrate in accordance with a desired focal length of the micro-optical component.

7. The method of claim 6, wherein said etching results in different focal lengths for at least two of the micro-optical components.

8. The method of claim 1, wherein said forming of compensation features includes etching the substrate in accordance with a measured focal length of the corresponding refractive surface.

9. The method of claim 1, wherein said forming of compensation features includes etching using a single mask to simultaneous create a pattern for all of the compensation features.

10. The method of claim 1, wherein said forming of compensation features includes etching using a single mask to create a pattern for the compensation features, the single mask being moved to create the pattern for the compensation features.

11. The method of claim 1, wherein a desired focal point of the micro-optical components is on a back surface of a substrate on which said at least two refractive surfaces are formed or on a substrate bonded thereto.

12. The method of claim 1, wherein said forming of compensation features includes forming a diffractive element.

13. The method of claim 1, wherein said forming of compensation features includes creating at least two corresponding compensation features for different compensation surfaces that are different from one another.

14. The method of claim 1, wherein said creating of the plurality of refractive surfaces includes using the same process for all of the refractive surfaces.

15. The method of claim 1, further wherein said measuring of optical performance includes measuring optical performance for each refractive.

16. The method of claim 1, further wherein said measuring of optical performance includes measuring optical performance for a subset of said plurality of refractive surfaces.

* * * * *